United States Patent
Zhang et al.

(10) Patent No.: US 9,599,851 B2
(45) Date of Patent: Mar. 21, 2017

(54) SUBSTRATE INCLUDING A COLOR FILTER LAYER MADE OF ELECTROCHROMIC MATERIAL, LIQUID CRYSTAL DISPLAY PANEL AND DISPLAY DEVICE

(71) Applicants: BOE Technology Group Co., Ltd., Beijing (CN); Beijing BOE Display Technology Co., Ltd., Beijing (CN)

(72) Inventors: Chunbing Zhang, Beijing (CN); Zheng Wang, Beijing (CN); Xianghua Jin, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 58 days.

(21) Appl. No.: 14/312,884

(22) Filed: Jun. 24, 2014

(65) Prior Publication Data

US 2015/0286091 A1    Oct. 8, 2015

(30) Foreign Application Priority Data

Apr. 3, 2014 (CN) .......................... 2014 1 0133745

(51) Int. Cl.
*G02F 1/1333* (2006.01)
*G02F 1/1335* (2006.01)
(Continued)

(52) U.S. Cl.
CPC ...... *G02F 1/133514* (2013.01); *G02F 1/1368* (2013.01); *G02F 1/13439* (2013.01);
(Continued)

(58) Field of Classification Search
CPC ............... G02F 1/133514; G02F 1/155; G02F 1/133512; G02F 1/134309; G02F 1/13439;
(Continued)

(56) References Cited

U.S. PATENT DOCUMENTS 8,384,983 B2    2/2013  Yashiro et al.
2010/0253767 A1*  10/2010  Wang ................ H04N 13/0452
                                                                  348/51
(Continued)

FOREIGN PATENT DOCUMENTS

CN        102879946 A        1/2013
CN    WO 2013023613 A1 *    2/2013   ............. G02F 1/167
(Continued)

OTHER PUBLICATIONS

First Office Action, including Search Report, for Chinese Patent Application No. 201410133745.5, dated Jan. 27, 2016, 15 pages.

*Primary Examiner* — Nathanael R Briggs
(74) *Attorney, Agent, or Firm* — Westman, Champlin & Koehler, P.A.

(57) ABSTRACT

The present invention discloses a substrate for a liquid crystal display panel, the liquid crystal display panel and a display device. The substrate comprises: a base substrate; a color layer disposed on the base substrate; and first and second transparent electrodes disposed on opposite sides of the color filter layer and electrically connected with the color filter layer. A color of the color filter layer can be changed based on gray scale of an image to be displayed on the liquid crystal display panel by applying a voltage signal to the color filter layer through the first and second transparent electrodes, thereby a light leakage in a dark state of the liquid crystal display panel is avoided, and thus it is possible to improve contrast of the liquid crystal display panel.

13 Claims, 6 Drawing Sheets

(51) Int. Cl.
*G02F 1/1343* (2006.01)
*G02F 1/1368* (2006.01)
*G02F 1/155* (2006.01)
*G02F 1/163* (2006.01)
*G02F 1/15* (2006.01)

(52) U.S. Cl.
CPC .. *G02F 1/133512* (2013.01); *G02F 1/134309* (2013.01); *G02F 1/15* (2013.01); *G02F 1/155* (2013.01); *G02F 1/163* (2013.01); *G02F 2001/134345* (2013.01); *G02F 2001/1515* (2013.01); *G02F 2001/1635* (2013.01); *G02F 2201/44* (2013.01); *G02F 2203/62* (2013.01)

(58) Field of Classification Search
CPC ............... G02F 1/1368; G02F 1/163; G02F 2001/134345; G02F 2001/1515; G02F 2001/1635; G02F 2201/44; G02F 2203/62; G02F 2001/1557; G02F 1/15
See application file for complete search history.

(56) References Cited

U.S. PATENT DOCUMENTS

| 2011/0261301 | A1  | 10/2011 | Noh et al. |
| 2013/0286334 | A1* | 10/2013 | Satoh ................ G02F 1/157 349/106 |
| 2014/0085578 | A1  | 3/2014  | Gu et al. |
| 2016/0033842 | A1  | 2/2016  | Shi et al. |

FOREIGN PATENT DOCUMENTS

| CN | 102967979 A  | 3/2013 |
| CN | 103529615 A  | 1/2014 |
| JP | 2012-53446 A | 3/2012 |

* cited by examiner

SUBSTRATE INCLUDING A COLOR FILTER LAYER MADE OF ELECTROCHROMIC MATERIAL, LIQUID CRYSTAL DISPLAY PANEL AND DISPLAY DEVICE

CROSS-REFERENCE TO RELATED APPLICATION

This application claims the benefit of Chinese Patent Application No. 201410133745.5 filed on Apr. 3, 2014 in the State Intellectual Property Office of China, the whole disclosure of which is incorporated herein by reference.

BACKGROUND OF THE INVENTION

Field of the Invention

Embodiments of the present invention generally relate to field of display technique, in particular, to a substrate including a color filter layer made of electrochromic material, a liquid crystal display panel and a display device.

Description of the Related Art

A liquid crystal display panel mainly comprises an array substrate, a color filter substrate, and liquid crystal molecules disposed between the array substrate and the color filter substrate. Generally, the array substrate is provided with gate lines, data lines, thin film transistors (TFTs), and pixel electrodes thereon, and the color filter substrate is provided with a black matrix, a color filter layer and common electrodes thereon.

In an operation condition of the liquid crystal display panel, when a scanning signal with high level is input to a gate line, TFTs connected with the gate line are in an ON state, and a gray scale signal carried on the data lines is applied to the pixel electrodes through the TFTs, an electric field is formed between the pixel electrodes and the common electrodes to control liquid crystal molecules to rotate so as to modulate backlight which has transmitted therethrough, so that light having different spectrum wavelength band is irradiated onto the color filter layer of the color filter substrate, which color filter layer has different transmittances for the light having different spectrum wavelength band to present light with desired colors eventually.

When the liquid crystal display panel is required to display a low gray scale image, the electric field between the pixel electrode and the common electrode controls the liquid crystal molecules to rotate so as to modulate the transmittance of the backlight to achieve a low gray scale display. However, when the existing liquid crystal display panel performs the low gray scale display, a part of the backlight may transmit through the liquid crystal molecules to exit from the color filter substrate so that a light leakage may be generated in a dark state, resulting in a decreased contrast of the image displayed on the liquid crystal display panel, and thus affecting display quality of the liquid crystal display panel to some extent.

SUMMARY OF THE INVENTION

The present invention has been made to overcome or alleviate at least one of the above mentioned disadvantages. An object of embodiments of the present invention is to provide a substrate including a color filter layer made of electrochromic materials, a liquid crystal display panel and a display device, in order to avoid a light leakage in a dark state of the liquid crystal display panel.

In an aspect of the present invention, there is provided a substrate for a liquid crystal display panel, comprising:
a base substrate;
a color filter layer disposed on the base substrate; and
a first transparent electrode and a second transparent electrode disposed on opposite sides of the color filter layer and electrically connected with the color filter layer,
wherein a material of the color filter layer comprises an electrochromic material, so that a color of the color filter layer can be changed based on gray scale of an image to be displayed on the liquid crystal display panel by applying a voltage signal to the color filter layer through the first and second transparent electrodes.

In another aspect of the present invention, there is provided a liquid crystal display panel comprising:
an array substrate;
an opposing substrate disposed opposite to the array substrate;
liquid crystal molecules disposed between the array substrate and the opposing substrate;
a color filter layer disposed on the opposing substrate or the array substrate; and
first and second transparent electrodes disposed on opposite sides of the color filter layer and electrically connected with the color filter layer,
wherein a material of the color filter layer comprises an electrochromic material, so that a color of the color filter layer can be changed based on gray scale of an image to be displayed on the liquid crystal display panel by applying a voltage signal to the color filter layer through the first and second transparent electrodes.

In yet another aspect of the present invention, there is provide a display device comprising the liquid crystal display panel as described above.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Particular embodiments of a substrate, a liquid crystal display panel and a display device according to the present invention will be described hereinafter in details with reference to the attached drawings.

Shapes and thicknesses of layers do not reflect the true scale of an array substrate or an opposing substrate in drawings and it is intended to illustrate the present invention schematically.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In an exemplary embodiment of the present invention, a substrate for a liquid crystal display panel is provided. As shown in FIGS. 1a to 1e, the substrate comprises: a base substrate 1; a color filter layer 2 disposed on the base substrate 1; and a first transparent electrode 3 and a second transparent electrode 4 disposed on both sides of the color filter layer 2 and electrically connected with the color filter layer 2.

In the above substrate, a material of the color filter layer 2 comprises an electrochromic material, so that a color of the color filter layer 2 can be changed based on gray scale of an image to be displayed on the liquid crystal display panel by applying a voltage signal to the color filter layer 2 through the first transparent electrode 3 and the second transparent electrode 4.

In the substrate as described above according to the present embodiment, the color of the color filter layer 2 can be changed by applying the voltage signal to the color filter layer 2 because the color filter layer 2 is made of the electrochromic material. For example, in one example, when the liquid crystal display panel is required to display a high gray scale image, a voltage signal of zero is applied to the color filter layer 2, and the color filter layer 2 maintains a normal light filtering color, and when the liquid crystal display panel is required to display a low gray scale image, a voltage signal larger than zero is applied to the color filter layer 2 through the first transparent electrode 3 and the second transparent electrode 4, so that the color of the color filter layer 2 can be changed for example, into black, to provide light with desired colors by changing transmittance of the light modulated by liquid crystal molecules. In this way, the color of the color filter layer 2 can be changed based on the gray scale of the image to be displayed on the liquid crystal display panel, thereby a light leakage in a dark state of the liquid crystal display panel is avoided, and thus it is possible to improve contrast of the liquid crystal display panel.

Further, according to an embodiment of the present invention, the first transparent electrode 3 and the second transparent electrode 4 form a capacitor therebetween, so that the color of the color filter layer 2 can be maintained for a time period after being changed by applying the voltage signal to the color filter layer 2 through the first transparent electrode 3 and the second transparent electrode 4.

According to an embodiment of the present invention, the first transparent electrode 3 and the second transparent electrode 4 are disposed on both sides of the color filter layer 2. Specifically, as shown in FIGS. 1a to 1d, the first transparent electrode 3, the color filter layer 2 and the second transparent electrode 4 may be laminated sequentially on the base substrate 1. Alternatively, as shown in FIG. 1e, the color filter layer 2, the first transparent electrode 3 and the second transparent electrode 4 may also disposed in the same layer on the base substrate 1, i.e., the first transparent electrode 3 and the second transparent electrode 4 are disposed on left and right sides of the color filter layer 2 as shown in the figure.

Figure 1A:
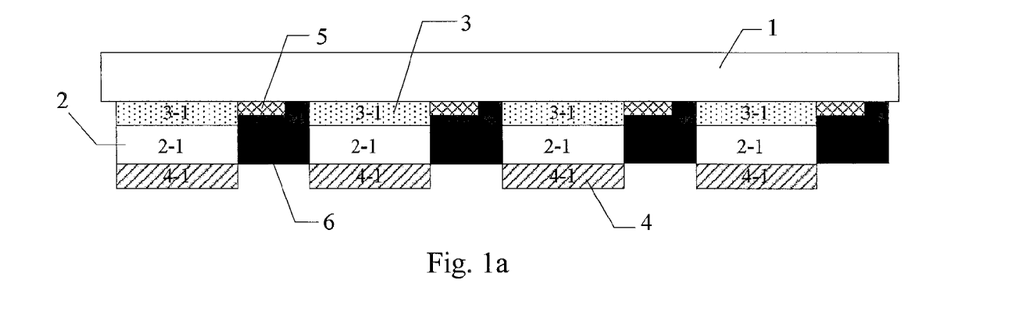
FIG. 1a to 1e are cross-section views showing a structure of a color filter substrate according to an exemplary embodiment of the present invention respectively.
Figure 1B:
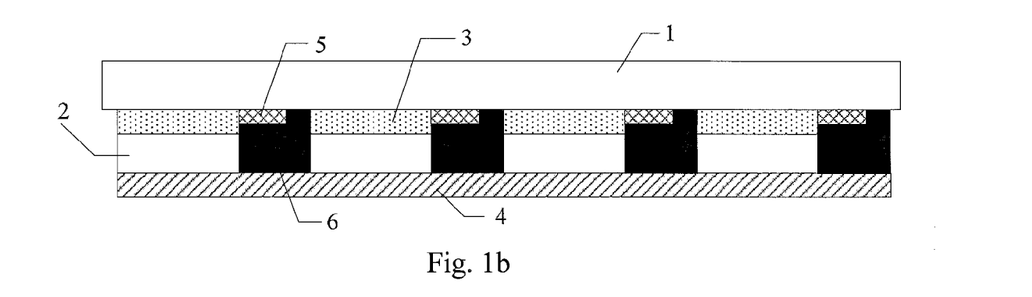
Figure 1C:
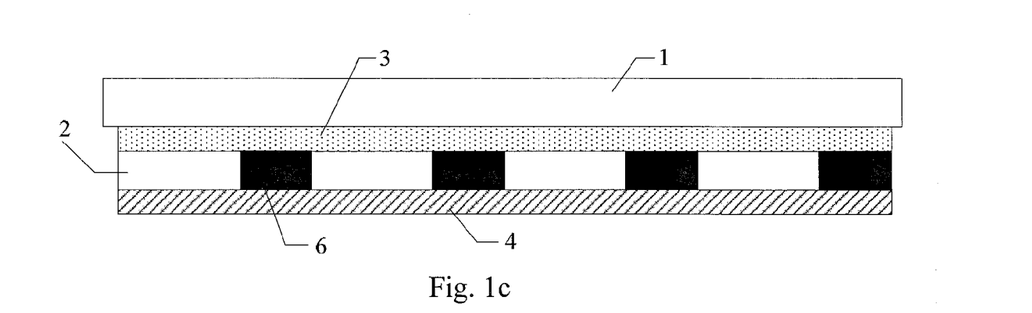
Figure 1D:
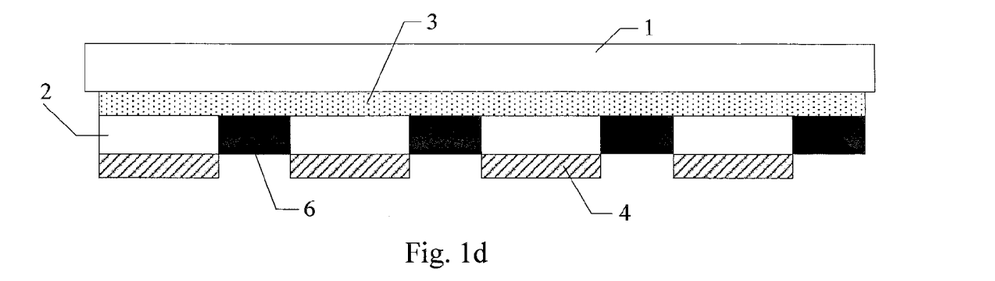
Figure 1E:
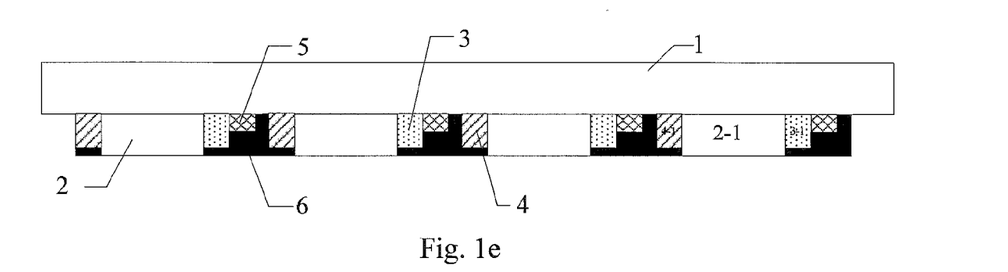

In one aspect of the present embodiment of the present invention, as shown in FIGS. 1a to 1e, the color filter layer 2 may include a plurality of color filters 2-1 arranged in a matrix (four color filters shown in FIGS. 1a and 1b). Correspondingly, at least one of the first and second transparent electrodes may include a plurality of sub-electrodes each corresponding to one of the plurality of color filters respectively. For example, the first transparent electrode 3 may include a plurality of first transparent sub-electrodes 3-1 each corresponding to one of the plurality of the color filters respectively (four first transparent sub-electrodes shown in FIGS. 1a and 1b). Preferably, in order to separately control each of the color filters to change its color based on the gray scale displayed by a respective sub-pixel unit, the substrate may further comprise a plurality of thin film transistors 5 each corresponding to and connecting electrically with one of the first transparent sub-electrodes 3-1 respectively, and a plurality of black matrix units 6 for spacing adjacent color filters apart from each other. Preferably, the first transparent sub-electrodes 3-1 are also spaced apart from each other by the black matrix units. Further, a projection region of each of the thin film transistors 5 on the base substrate 1 may be disposed within a projection region of each of the black matrix units 6 on the base substrate 1. For example, each thin film transistor 5 is covered with a respective black matrix unit 6, as shown in FIGS. 1a, 1b and 1e.

According to an embodiment of the present invention, when a sub-pixel unit corresponding to a color filter 2-1 displays a high gray scale image, the thin film transistor 5 electrically connected with the first transparent sub-electrode 3-1 corresponding to the color filter is in an OFF state, and the color filter has its normal light filtering color. When a sub-pixel unit corresponding to a color filter displays a low gray scale image, the thin film transistor 5 electrically connected with the first transparent sub-electrode corresponding to the color filter is in an ON state, and the color of the color filter can be changed, for example, into black, by applying a voltage signal to the color filter through the respective first transparent sub-electrode 3-1 and the second transparent electrode 4. In this way, a light leakage in a dark state of the liquid crystal display panel is avoided, thus improving contrast of the liquid crystal display panel.

Preferably, in order to avoid an interference of an electric field formed between the first transparent electrode 3 and the second transparent electrode 4 with an electric field for controlling rotation of the liquid crystal molecules which is an electric field formed between a pixel electrode and a common electrode, as shown in FIGS. 1b and 1c, the first transparent electrode 3, the color filter layer 2 and the second transparent electrode 4 may are laminated sequentially on the base substrate 1 in the substrate as described above according to the present embodiment. Further, the second transparent electrode 4 may be formed as a single plate electrode to cover the first transparent electrode 3 and the color filter layer 2 in a laminated manner. Such a single plate transparent electrode 4 can have a shielding effect to avoid the interference of the electric field between the first transparent electrode 3 and the second transparent electrode 4 with the electric field between the pixel electrode and the common electrode, thereby preventing display quality of the liquid crystal display panel from being affected.

Of course, in the substrate according to embodiments of the present invention, as shown in FIG. 1c, both of the first transparent electrode 3 and the second transparent electrode 4 may be single plate electrodes respectively, wherein the single plate second transparent electrode 4 can have a shielding effect to avoid the interference of the electric field between the first transparent electrode 3 and the second transparent electrode 4 with the electric field between the pixel electrode and the common electrode, thereby preventing display quality of the liquid crystal display panel from being affected. Alternatively, as shown in FIG. 1d, the first transparent electrode 3 may be a single plate electrode, and the second transparent electrode 4 may include a plurality of second transparent sub-electrodes 4-1 each corresponding to one of the color filters 2-1 respectively (four second transparent sub-electrodes shown in FIG. 1d). In such a case, as described with respect to the first transparent sub-electrodes, a plurality of thin film transistors (not shown) may be provided, each of which corresponds to and is electrically connected with one of the plurality of second transparent sub-electrodes 4-1 respectively. Alternatively, as shown in FIG. 1a, each of the first and second transparent electrodes includes a plurality of sub-electrodes each corresponding to one of the plurality of color filters respectively. As an alternative to the example shown in FIG. 1a, each of the thin film transistors 5 may be disposed to correspond to and be electrically connected with one of the second transparent sub-electrodes 4-1 respectively.

It is not necessary to provide the thin film transistors 5 electrically connected with the first transparent electrode 3, as in the substrate shown in FIGS. 1c and 1d. When the voltage signal is applied to the color filter layer 2 through the first transparent electrode 3 and the second transparent electrode 4, the color of the entire color filter layer 2 can be changed, for example, into black, and thus the liquid crystal display panel can display an image at a low luminance.

Alternatively, in the substrate as described above according to embodiments of the present invention, as shown in FIGS. 1a and 1b, when the color filter layer 2 includes the plurality of color filters 2-1 arranged in the matrix (four color filters shown in FIGS. 1a and 1b) and the first transparent electrode 3 includes the plurality of first transparent sub-electrodes 3-1 each corresponding to one of the plurality of color filters respectively (four first transparent sub-electrodes shown in FIGS. 1a and 1b), it is also possible to remove the thin film transistors 5 each corresponding to and electrically connected with one of the first transparent sub-electrodes. When the voltage signal is applied to the color filter layer 2 through all the first transparent sub-electrodes and the second transparent electrode 4, the color of the entire color filter layer 2 can be changed, and thus the liquid crystal display panel can display an image at a low luminance.

Further, in the substrate as shown in FIG. 1e, other arrangements of the substrate may be similar to those of the substrate shown in FIG. 1a, except that the first transparent electrode 3 and the second transparent electrode 4 are disposed on left and right sides of the color filter layer, and thus the unnecessary detailed descriptions thereof are omitted.

In the substrate as described above according to embodiments of the present invention, the electrochromic material may comprise polyaniline materials, viologen materials or polythiophene materials, or any combination thereof, the present invention, however, is not limited thereto. Further, red filters (R), green filters (G) and blue filters (B) may be made of the above materials at different doping concentrations. The color of the color filter layer 2 made of the above electrochromic materials can be changed when a voltage signal is applied thereto. For example, when the liquid crystal display panel is required to display a high gray scale image, a voltage signal of zero is applied to the color filter layer 2, and the color filter layer 2 maintains a normal light filtering color, and when the liquid crystal display panel is required to display a low gray scale image, a voltage signal larger than zero is applied to the color filter layer 2, so that the color of the color filter layer 2 can be changed, for example, into black. In this way, the color of the color filter layer 2 can be changed according to the gray scale of the image to be displayed on the liquid crystal display panel, thereby a light leakage in a dark state of the liquid crystal display panel is avoided, and thus it is possible to improve contrast of the liquid crystal display panel.

Based on the same inventive concept as the above substrate, in another exemplary embodiment of the present invention, a liquid crystal display panel is provided. As shown in FIGS. 2a to 2e, the liquid crystal display panel comprises:

an array substrate 8;
an opposing substrate 7 disposed opposite to the array substrate 8;
liquid crystal molecules 11 disposed between the array substrate 8 and the opposing substrate 7;
a color filter layer 2 disposed on the opposing substrate 7 or the array substrate 8; and
a first transparent electrode 3 and a second transparent electrode 4 disposed on opposite sides of the color filter layer 2 and electrically connected with the color filter layer 2.

In the liquid crystal display panel, a material of the color filter layer 2 comprises an electrochromic material, so that a color of the color filter layer 2 can be changed based on gray scale of an image to be displayed on the liquid crystal display panel by applying a voltage signal to the color filter layer 2 through the first transparent electrode 3 and the second transparent electrode 4.

In the liquid crystal display panel as described above according to the present embodiment, the color of the color filter layer 2 can be changed by applying the voltage signal to the color filter layer 2 because the color filter layer 2 is made of the electrochromic material. For example, when the liquid crystal display panel is required to display a high gray scale image, a voltage signal of zero is applied to the color filter layer 2, and the color filter layer 2 maintains a normal light filtering color, and when the liquid crystal display panel is required to display a low gray scale image, a voltage signal larger than zero is applied to the color filter layer 2 through the first transparent electrode 3 and the second transparent electrode 4, so that the color of the color filter layer 2 can be changed. In this way, the color of the color filter layer 2 can be changed based on the gray scale of the image to be displayed on the liquid crystal display panel, thereby a light leakage in a dark state of the liquid crystal display panel is avoided, and thus it is possible to improve contrast of the liquid crystal display panel.

Further, in the liquid crystal display panel as described above according to the present embodiment, the first transparent electrode 3 and the second transparent electrode 4 form a capacitor therebetween, so that the color of the color filter layer 2 can be maintained for a time period after being changed, for example, into black, when the voltage signal is applied to the color filter layer 2 through the first transparent electrode 3 and the second transparent electrode 4. Obviously, in the liquid crystal display panel of the present embodiment, other arrangements of the color filter layer 2, the first transparent electrode 3, the second transparent electrode 4 and the thin film transistors 5 and/or the black matrix units 6 and the like are similar to those of the substrate as described above.

The above liquid crystal display panel according to embodiments of the present invention will be described below by way of two particular examples in details.

Example 1

In this example, the color filter layer 2, the first transparent electrode 3 and the second transparent electrode, 4 are all disposed on the opposing substrate 7, and in this case, the opposing substrate 7 can be referred to as or correspond to a color filter substrate.

Specifically, the first transparent electrode 3 and the second transparent electrode 4 are disposed on both sides of the color filter layer 2. As shown in FIGS. 2a to 2d, the first transparent electrode 3, the color filter layer 2 and the second transparent electrode 4 may be laminated sequentially on the opposing substrate 7. Alternatively, as shown in FIG. 2e, the color filter layer 2, the first transparent electrode 3 and the second transparent electrode 4 may also disposed in the same layer on the opposing substrate 7, the present invention, however, is not limited thereto. In the present example, pixel electrodes 9 may be disposed on the array substrate 8, and liquid crystal molecules 11 are disposed between the pixel electrodes 9 and the second transparent electrode 4 as shown in FIGS. 2a to 2d, or between the pixel electrodes 9 and the color filter layer 2 as shown in FIG. 2e.

Figure 2A:
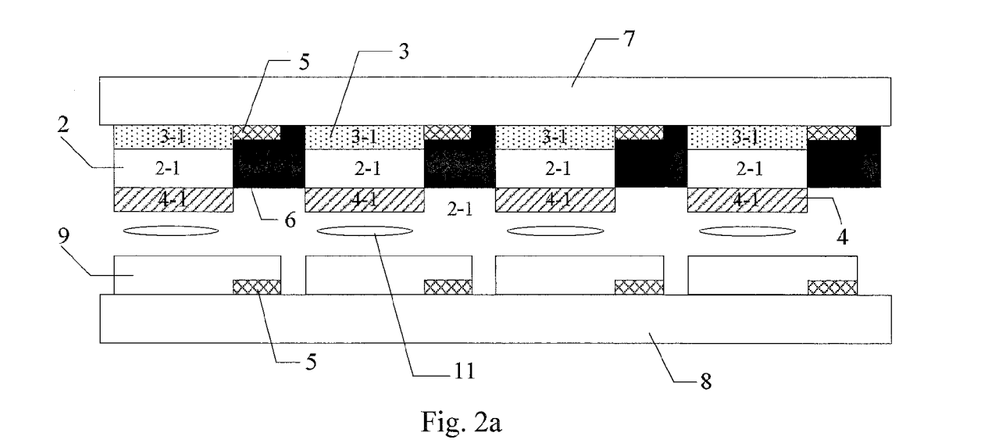
FIGS. 2a to 2e are cross-section views showing a structure of a liquid crystal display panel according to an exemplary embodiment of the present invention respectively.
Figure 2B:
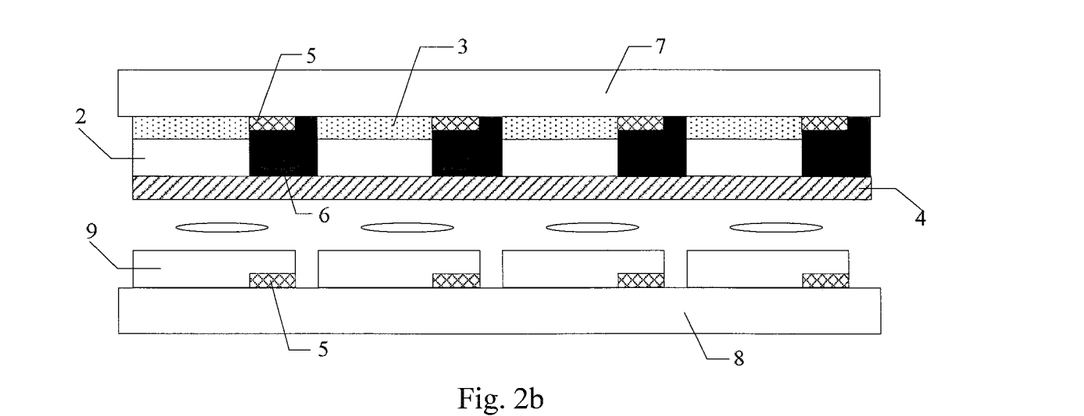

In one aspect of the present example, as shown in FIGS. 2a and 2b, the color filter layer 2 may include a plurality of color filters 2-1 arranged in a matrix (four color filters shown in FIGS. 2a and 2b). Preferably, the first transparent electrode 3 may include a plurality of first transparent sub-electrodes 3-1 each corresponding to one of the plurality of the color filters respectively (four first transparent sub-electrodes shown in FIGS. 2a and 2b). Preferably, in order to separately control each of the color filters to change its color based on the gray scale to be displayed a respective sub-pixel unit, the liquid crystal display further comprises a plurality of thin film transistors 5 each corresponding to and electrically connected with one of the first transparent sub-electrodes respectively, wherein a projection region of each of the thin film transistors 5 on the opposing substrate 7 may be disposed within a projection region of a respective black matrix unit 6 on the opposing substrate 7.

In the liquid crystal display panel, for example, when a sub-pixel unit corresponding to a color filter displays a high gray scale image, the thin film transistor 5 electrically connected with the first transparent sub-electrode corresponding to the color filter is in an OFF state, and the color filter has its normal light filtering color; when a sub-pixel unit corresponding to a color filter display a low gray scale image, the thin film transistor 5 electrically connected with the first transparent sub-electrode corresponding to the color filter is in an ON state, and the color of the color filter can be changed, for example, into black, by applying a voltage signal to the color filter through the respective first transparent sub-electrode and the second transparent electrode 4. In this way, a light leakage in a dark state of the liquid crystal display panel is avoided, thus improving contrast of the liquid crystal display panel.

Preferably, in the liquid crystal display panel as described above, in order to avoid an interference of an electric field formed between the first transparent electrode 3 and the second transparent electrode 4 with an electric field for controlling rotation of the liquid crystal molecules which is an electric field formed between the pixel electrode 9 and a common electrode (not shown), the first transparent electrode 3, the color filter layer 2 and the second transparent electrode 4 may are laminated sequentially on the opposing substrate 7 as shown in FIG. 2b. Preferably, the second transparent electrode 4 may be formed as a single plate electrode. Such a single plate second transparent electrode 4 can have a shielding effect to avoid the interference of the electric field between the first transparent electrode 3 and the second transparent electrode 4 with the electric field between the pixel electrode 9 and the common electrode, thereby preventing display quality of the liquid crystal display panel from being affected. In the present example, each pixel electrode 9 and a respective first transparent sub-electrode 3-1 (alternatively, a respective second transparent sub-electrode 4-1) may correspond to and be electrically connected with one of the thin film transistors 5, as shown in FIGS. 2a to 2e.

Furthermore, in the liquid crystal display panel as shown in FIG. 2b, the single plate second transparent electrode 4 may be also reused as the common electrode of the liquid crystal display panel. That is, the second transparent electrode 4 may be not only used as an electrode for forming an electric field together with the first transparent electrode 3 to control the color of the color filter layer 2, but also used as a common electrode for forming an electric filed together with the pixel electrode 9 to control rotation of the liquid crystal molecules. Further, the second transparent electrode 4 can also have a shielding effect to avoid the interference between the above two electric fields.

Figure 2C:
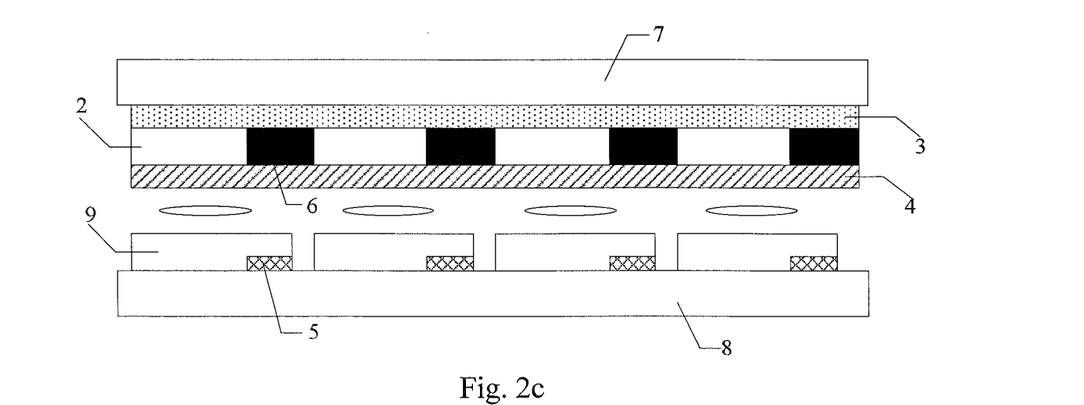
Figure 2D:
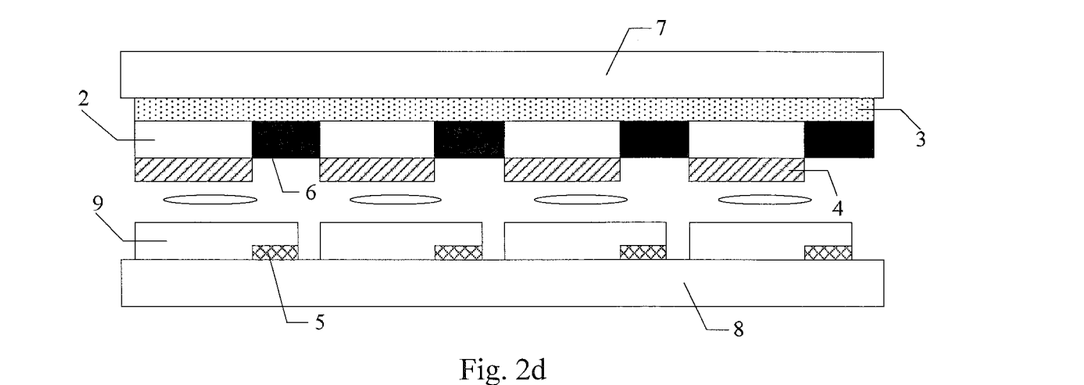
Figure 2E:
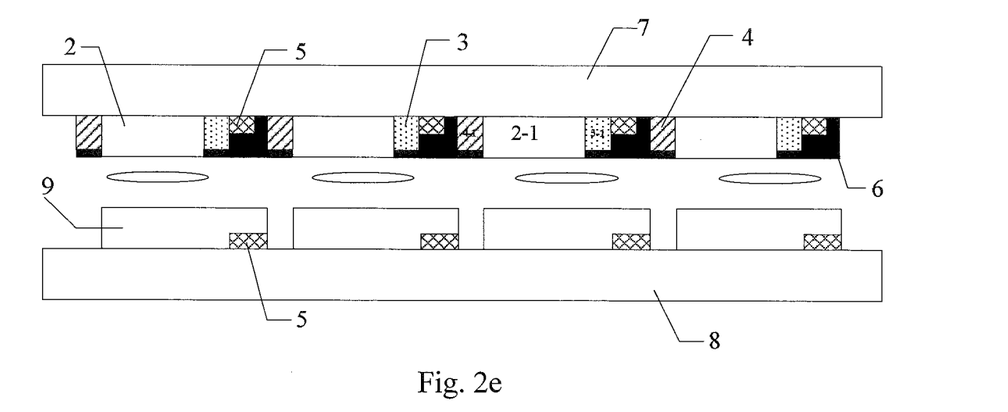

Of course, in one aspect of the present example, as shown in FIG. 2c, both of the first transparent electrode 3 and the second transparent electrode 4 may be single plate electrodes respectively, wherein the single plate second transparent electrode 4 can have a shielding effect to avoid the interference of the electric field between the first transparent electrode 3 and the second transparent electrode 4 with the electric field between the pixel electrode 9 and the common electrode, thereby preventing display quality of the liquid crystal display panel from being affected. Alternatively, as shown in FIG. 2d, the first transparent electrode 3 may be a single plate electrode, and the second transparent electrode 4 may include a plurality of second transparent sub-electrodes 4-1 each corresponding to one of the color filters respectively (four second transparent electrodes shown in FIG. 2d). In such a case, as described with respect to the first transparent sub-electrodes, a plurality of thin film transistors (not shown) may be provided, each of which corresponds to and is electrically connected with one of the plurality of second transparent sub-electrodes 4-1 respectively. Alternatively, as shown in FIG. 2a, each of the first and second transparent electrodes may include a plurality of sub-electrodes each corresponding to one of the plurality of color filters respectively. As an alternative to the example shown in FIG. 2a, each of the thin film transistors 5 may be disposed to correspond to and be electrically connected with one of the second transparent sub-electrodes 4-1 respectively. However, the present invention is not limited to this.

It is not necessary to provide the thin film transistors 5 electrically connected with the first transparent electrode 3, as in the liquid crystal display panel shown in FIGS. 2c and 2d. In such a case, when a voltage signal is applied to the color filter layer 2 through the first transparent electrode 3 and the second transparent electrode 4, the color of the entire color filter layer 2 can be changed into black, and thus the liquid crystal display panel can display an image at a low luminance.

Further, in one aspect of the present example, as shown in FIGS. 2a and 2b, when the color filter layer 2 includes the plurality of color filters 2-1 arranged in the matrix (four color filters shown in FIGS. 2a and 2b) and the first transparent electrode 3 includes the plurality of first transparent sub-electrodes 3-1 each corresponding to one of the plurality of color filters respectively (four first transparent sub-electrodes shown in FIGS. 2a and 2b), it is also possible to remove the thin film transistors 5 each corresponding to and electrically connected with one of the first transparent sub-electrodes. When the voltage signal is applied to the color filter layer 2 through all the first transparent sub-electrodes and the second transparent electrode 4, the color of the entire color filter layer 2 can be changed, for example, into black, and thus the liquid crystal display panel can display an image at a low luminance.

Further, in the liquid crystal display panel as shown in FIG. 2e, other arrangements of the liquid crystal display panel may be similar to those of the liquid crystal display panel shown in FIG. 2a except for the first transparent electrode 3 and the second transparent electrode 4 being disposed on left and right sides of the color filter layer 2 (that is, a first transparent sub-electrode 3-1 and a second transparent sub-electrode 4-1 are disposed on left and right sides of a respective color filter 2-1, as shown in the figure), and thus the unnecessary detailed descriptions thereof are omitted.

In the liquid crystal display panel as described above according to the present example, the electrochromic material may comprise polyaniline materials, viologen materials, polythiophene material or any combination thereof, the present invention, however, is not limited thereto. Further, red filters (R), green filters (G) and blue filters (B) may be made of the above materials at different doping concentrations. The color of the color filter layer 2 made of the above electrochromic materials can be changed when a voltage signal is applied thereto. For example, when the liquid crystal display panel is required to display a high gray scale image, a voltage signal of zero is applied to the color filter layer 2, and the color filter layer 2 may maintain its normal light filtering color, and when the liquid crystal display panel is required to display a low gray scale image, a voltage signal larger than zero is applied to the color filter layer 2, so that the color of the color filter layer 2 is changed. In this way, the color of the color filter layer 2 can be changed according to the gray scale of the image to be displayed on the liquid crystal display panel, thereby a light leakage in a dark state of the liquid crystal display panel is avoided, and thus it is possible to improve contrast of the liquid crystal display panel.

Example 2

In this example, the color filter layer 2, the first transparent electrode 3 and the second transparent electrode, 4 are all disposed on the array substrate 8.

Specifically, the first transparent electrode 3 and the second transparent electrode 4 are disposed on both sides of the color filter layer 2. As shown in FIGS. 3a to 3d, the first transparent electrode 3, the color filter layer 2 and the second transparent electrode 4 may be laminated sequentially on the array substrate 8. Alternatively, as shown in FIG. 3e, the color filter layer 2, the first transparent electrode 3 and the second transparent electrode 4 may also disposed in the same layer on the array substrate 8, the present invention, however, is not limited thereto. In the present example, pixel electrodes 9 may be disposed on the second transparent electrode 4 as shown in FIGS. 3a to 3d or on the color filter layer 2 as shown in FIG. 2e, a common electrode 10 is disposed on the opposing substrate 7, and liquid crystal molecules 11 are disposed between the common electrode 10 and the pixel electrodes 9.

Figure 3A:
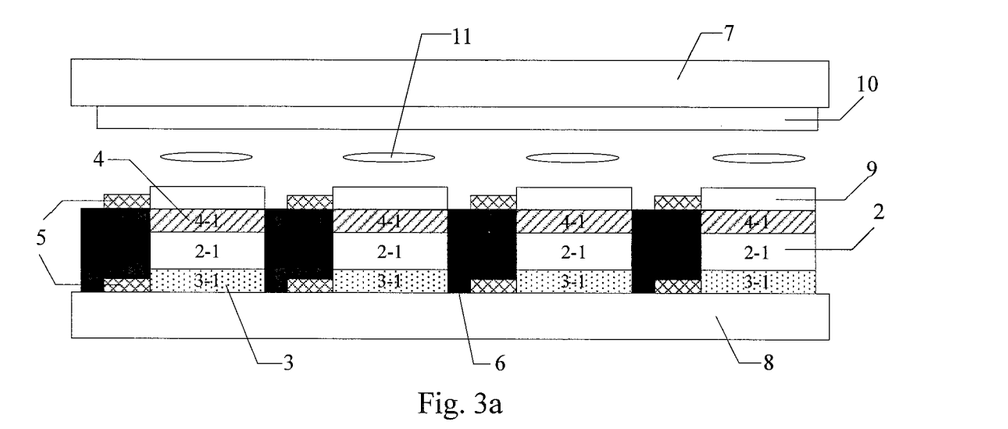
FIGS. 3a to 3e are cross-section views showing a structure of a liquid crystal display panel according to another exemplary embodiment of the present invention respectively.
Figure 3B:
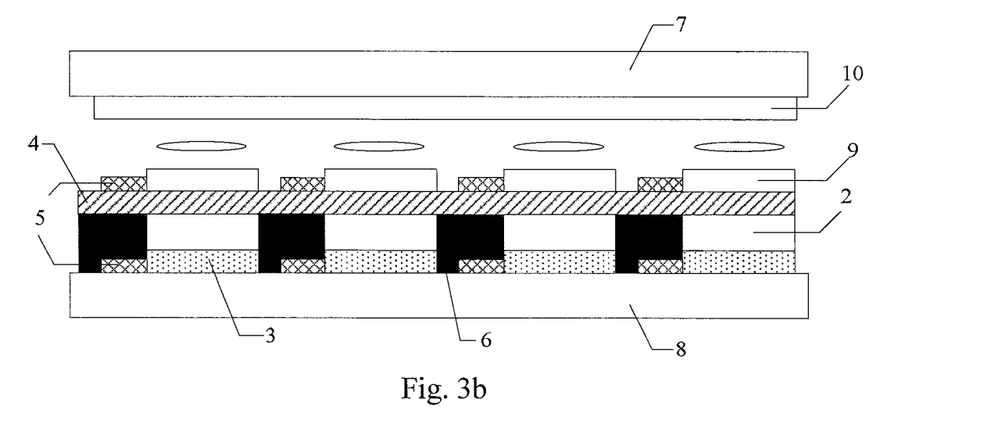

In one aspect of the present example, as shown in FIGS. 3a and 3b, the color filter layer 2 may include a plurality of color filters 2-1 arranged in a matrix (four color filters shown in FIGS. 3a and 3b), and the first transparent electrode 3 may include a plurality of first transparent sub-electrodes 3-1 each corresponding to one of the plurality of the color filters respectively (four first transparent sub-electrodes shown in FIGS. 3a and 3b). Preferably, in order to separately control each of the color filters to change its color based on the gray scale to be displayed on a respective sub-pixel unit, the liquid crystal display further comprises a plurality of thin film transistors 5 each corresponding to and electrically connected with one of the first transparent sub-electrodes respectively, wherein a projection region of each of the thin film transistors 5 on the array substrate 8 may be disposed within a projection region of a respective black matrix unit 6 on the array substrate 8.

In the present example, when a sub-pixel unit corresponding to a color filter displays a high gray scale image, the thin film transistor 5 electrically connected with the first transparent sub-electrode corresponding to the color filter is in an OFF state, and the color filter has its normal light filtering color. When a sub-pixel unit corresponding to a color filter display a low gray scale image, the thin film transistor 5 connecting electrically with the first transparent sub-electrode corresponding to the color filter is in an ON state, and the color of the color filter can be changed for example into black by applying a voltage signal to the color filter through the respective first transparent sub-electrode and the second transparent electrode 4. In this way, a light leakage in a dark state of the liquid crystal display panel is avoided, thus improving contrast of the liquid crystal display panel.

Preferably, in the above liquid crystal display panel, in order to avoid an interference of an electric field formed between the first transparent electrode 3 and the second transparent electrode 4 with an electric field for controlling rotation of the liquid crystal molecules which is an electric field formed between the pixel electrodes 9 and the common electrode 10, the first transparent electrode 3, the color filter layer 2 and the second transparent electrode 4 may are laminated sequentially on the array substrate 8 as shown in FIG. 3b. Further, the second transparent electrode 4 may be formed as a single plate electrode. Such a single plate second transparent electrode 4 can have a shielding effect to avoid the interference of the electric field between the first transparent electrode 3 and the second transparent electrode 4 with the electric field between the pixel electrode 9 and the common electrode 10, thereby preventing display quality of the liquid crystal display panel from being affected. In the present example, as shown in FIGS. 3a to 3e, each of the pixel electrodes 9 and each of the respective first transparent sub-electrodes 3-1 (alternatively, the second transparent sub-electrodes 4-1) may correspond to and be electrically connected with one of the thin film transistors 5.

Figure 3C:
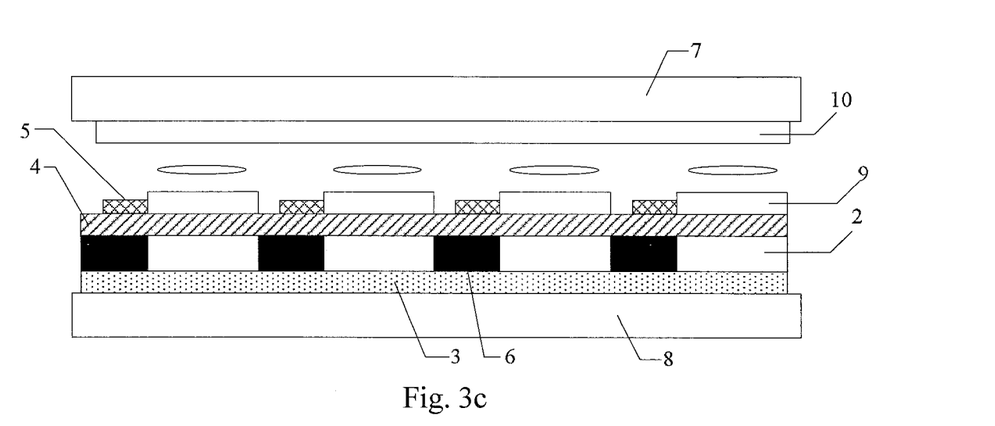
Figure 3D:
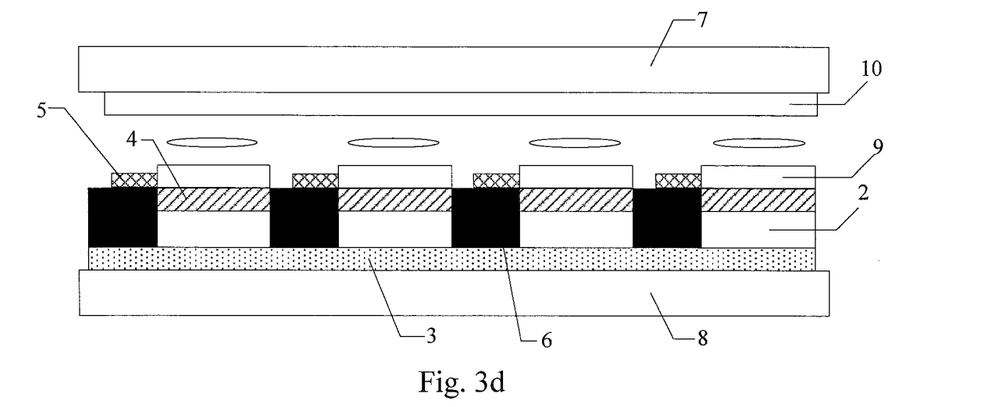
Figure 3E:
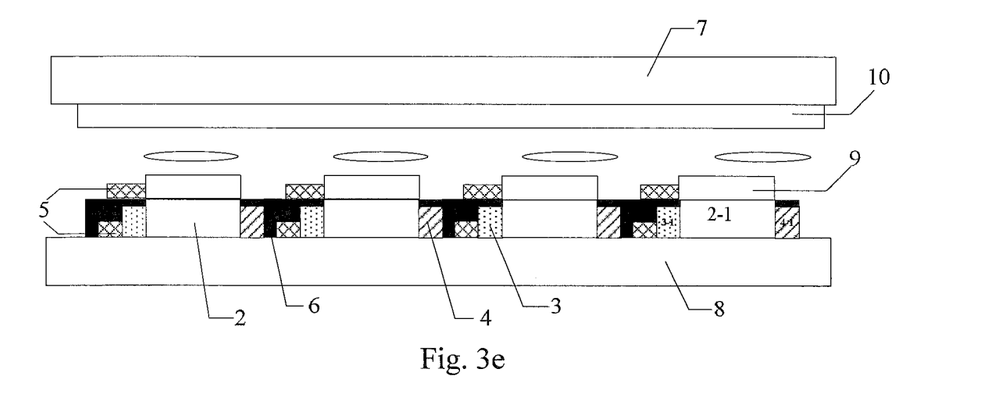

Of course, in one aspect of the present example, as shown in FIG. 3c, both of the first transparent electrode 3 and the second transparent electrode 4 may be single plate electrodes respectively, wherein such a single plate second transparent electrode 4 can have a shielding effect to avoid the interference of the electric field between the first transparent electrode 3 and the second transparent electrode 4 with the electric field between the pixel electrodes 9 and the common electrode 10, thereby preventing display quality of the liquid crystal display panel from being affected. Alternatively, as shown in FIG. 3d, the first transparent electrode 3 may be a single plate electrode, and the second transparent electrode 4 may include a plurality of second transparent sub-electrodes each corresponding to one of the color filters respectively (four second transparent electrodes shown in FIG. 3d). In such a case, as described with respect to the first transparent sub-electrodes, a plurality of thin film transistors (not shown) may be provided, each of which corresponds to and is electrically connected with one of the plurality of second transparent sub-electrodes 4-1 respectively. Alternatively, as shown in FIG. 3*a*, each of the first and second transparent electrodes includes a plurality of sub-electrodes each corresponding to one of the plurality of color filters respectively. As an alternative to the example shown in FIG. 3*a*, each of the thin film transistors 5 may be disposed to correspond to and be electrically connected with one of the second transparent sub-electrodes 4-1 respectively. However, the present invention is not limited to this.

It is not necessary to provide the thin film transistors 5 electrically connected with the first transparent electrode 3, as in the liquid crystal display panel shown in FIGS. 3*c* and 3*d*. in such a case, when a voltage signal is applied to the color filter layer 2 through the first transparent electrode 3 and the second transparent electrode 4, the color of the entire color filter layer 2 can be changed for example into black, and thus the liquid crystal display panel can display an image at a low luminance.

Further, in one aspect of the present example, as shown in FIGS. 3*a* and 3*b*, when the color filter layer 2 includes a plurality of color filters 2-1 arranged in the matrix (four color filters shown in FIGS. 3*a* and 3*b*) and the first transparent electrode 3 includes a plurality of first transparent sub-electrodes 3-1 each corresponding to one of the plurality of color filters respectively (four first transparent sub-electrodes shown in FIGS. 3*a* and 3*b*), it is also possible to remove the thin film transistors 5 each corresponding to and electrically connected with one of the first transparent sub-electrodes. When the voltage signal is applied to the color filter layer 2 through all the first transparent sub-electrodes and the second transparent electrode 4, the color of the entire color filter layer 2 can be changed for example into black, and thus the liquid crystal display panel can display an image at a low luminance.

Further, in the liquid crystal display panel as shown in FIG. 3*e*, other arrangements of the liquid crystal display panel may be similar to those of the liquid crystal display panel shown in FIG. 3*a* except for the first transparent electrode 3 and the second transparent electrode 4 being disposed on left and right sides of the color filter layer, and thus the unnecessary detailed descriptions thereof are omitted.

Specifically, in the liquid crystal display panel as described above according to the present example, the electrochromic material may comprise polyaniline materials, viologen materials, polythiophene materials or any combination thereof, the present invention, however, is not limited thereto. Further, red filters (R), green filters (G) and blue filters (B) may be made of the above materials at different doping concentrations. The color of the color filter layer 2 made of the above electrochromic materials can be changed color when a voltage signal is applied thereto. For example, when the liquid crystal display panel is required to display a high gray scale image, a voltage signal of zero is applied to the color filter layer 2, and the color filter layer 2 may maintain its normal light filtering color, and when the liquid crystal display panel is required to display a low gray scale image, a voltage signal larger than zero is applied to the color filter layer 2, so that the color of the color filter layer 2 is changed. In this way, the color of the color filter layer 2 can be changed according to the gray scale of the image to be displayed on the liquid crystal display panel, thereby a light leakage in a dark state of the liquid crystal display panel is avoided, and thus it is possible to improve contrast of the liquid crystal display panel.

Based on the same inventive concept, a display device is provided in a further embodiment of the present invention.

The display device comprises a mobile phone, a tablet computer, a television set, a display, a laptop computer, a digital frame, a navigator or any products or components having display functions.

In embodiments of the present invention, a substrate for a liquid crystal display panel, the liquid crystal display and a display device are provided. The substrate comprises: a base substrate; a color layer disposed on the substrate; and first and second transparent electrodes disposed on opposite sides of the color filter layer and electrically connected with the color filter layer. The color of the color filter layer can be changed by applying a voltage signal to the color filter layer because the color filter layer is made of an electrochromic material. For example, when the liquid crystal display panel is required to display a high gray scale image, a voltage signal of zero is applied to the color filter layer, and the color filter layer may maintain its normal light filtering color, and when the liquid crystal display panel is required to display a low gray scale image, a voltage signal larger than zero is applied to the color filter layer through the first and second transparent electrodes, so that the color of the color filter layer is changed, for example, into black. In this way, the color of the color filter layer can be changed based on the gray scale of the image to be displayed on the liquid crystal display panel, thereby a light leakage in a dark state of the liquid crystal display panel is avoided, and thus it is possible to improve contrast of the liquid crystal display panel.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A substrate for a liquid crystal display panel, comprising:
   a base substrate;
   a color filter layer disposed on the base substrate and configured as a color filter layer of the liquid crystal display panel, the color filter layer including a plurality of color filters including red filters, green filters and blue filters arranged in a matrix;
   a plurality of black matrix units each located between two adjacent color filters so as to space the two adjacent color filters apart from each other;
   a plurality of thin film transistors, each thin film transistor being arranged so that its projection area on the base substrate is located within a projection area of a corresponding black matrix unit on the base substrate; and
   first and second transparent electrodes respectively disposed on left and right sides of the color filter layer such that the first transparent electrode, the color filter layer and the second transparent electrode are disposed in the same layer on the base substrate, and the first transparent electrode and the second transparent electrode are electrically connected with the color filter layer,
   wherein the color filter layer comprises an electrochromic material layer, which is configured to change its color based on gray scale of an image to be displayed on the liquid crystal display panel.

2. The substrate according to claim 1, wherein the color filter layer is configured to maintain a normal light filtering color when the liquid display panel displays a high gray scale image and change its color when the liquid display panel displays a low gray scale image.

3. The substrate according to claim 2, wherein the color filter layer is configured to change its color into black when the liquid display panel displays the low gray scale image.

4. The substrate according to claim 1, wherein at least one of the first and second transparent electrodes includes a plurality of sub-electrodes each corresponding to one of the plurality of color filters respectively.

5. The substrate according to claim 4, wherein each of the plurality of thin film transistors corresponds to and is electrically connected with one of the plurality of sub-electrodes respectively.

6. The substrate according to claim 1, wherein the electrochromic material comprises at least one of polyaniline, viologen and polythiophene materials.

7. A liquid crystal display panel comprising:
an array substrate;
an opposing substrate disposed opposite to the array substrate;
liquid crystal molecules disposed between the array substrate and the opposing substrate;
a color filter layer disposed on the opposing substrate or the array substrate, the color filter layer including a plurality of color filters including red filters, green filters and blue filters arranged in a matrix;
a plurality of black matrix units each located between two adjacent color filters so as to space the two adjacent color filters apart from each other;
a plurality of thin film transistors, each thin film transistor being arranged so that its projection area on the base substrate is located within a projection area of a corresponding black matrix unit on the base substrate; and
first and second transparent electrodes respectively disposed on left and right sides of the color filter layer such that the first transparent electrode, the color filter layer and the second transparent electrode are disposed in the same layer on the opposing substrate or on the array substrate, and the first transparent electrode and the second transparent electrode are electrically connected with the color filter layer,
wherein the color filter layer comprises an electrochromic material layer, which is configured to change its color based on gray scale of an image to be displayed on the liquid crystal display panel.

8. The liquid crystal display panel according to claim 7, wherein the color filter layer is configured to maintain a normal light filtering color when the liquid display panel displays a high gray scale image and change its color when the liquid display panel displays a low gray scale image.

9. The liquid crystal display panel according to claim 8, wherein the color filter layer is configured to change its color into black when the liquid display panel displays the low gray scale image.

10. The liquid crystal display panel according to claim 7, wherein at least one of the first and second transparent electrodes includes a plurality of sub-electrodes each corresponding to one of the plurality of color filters respectively.

11. The liquid crystal display panel according to claim 10, wherein each of the
plurality of thin film transistors corresponds to and is electrically connected with one of the first transparent sub-electrodes respectively.

12. The liquid crystal display panel according to claim 7, wherein the electrochromic material comprises at least one of polyaniline, viologen and polythiophene materials.

13. A display device comprising the liquid crystal display panel according to claim 7.

* * * * *